United States Patent
Nanni et al.

(10) Patent No.: US 9,825,355 B2
(45) Date of Patent: Nov. 21, 2017

(54) WIRELESS STEREO HEADSET ANTENNA SYSTEM

(71) Applicant: Motorola Mobility LLC, Chicago, IL (US)

(72) Inventors: Peter Nanni, Algonquin, IL (US); Mohammed Abdul-Gaffoor, Palatine, IL (US); Thomas D Nagode, Mundelein, IL (US); Chiya Saeidi, Chicago, IL (US); Louis J Vannatta, Crystal Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 104 days.

(21) Appl. No.: 14/973,914

(22) Filed: Dec. 18, 2015

(65) Prior Publication Data

US 2017/0180844 A1    Jun. 22, 2017

(51) Int. Cl.

| H04R 5/02 | (2006.01) |
| H01Q 1/36 | (2006.01) |
| H04W 76/02 | (2009.01) |
| H04R 1/10 | (2006.01) |
| H04R 5/033 | (2006.01) |
| H04R 5/04 | (2006.01) |
| H01Q 1/27 | (2006.01) |
| H01Q 1/48 | (2006.01) |
| H01Q 9/16 | (2006.01) |

(52) U.S. Cl.
CPC ............ *H01Q 1/362* (2013.01); *H01Q 1/273* (2013.01); *H01Q 1/48* (2013.01); *H04R 1/1016* (2013.01); *H04R 1/1041* (2013.01); *H04R 5/033* (2013.01); *H04R 5/04* (2013.01); *H04W 76/02* (2013.01); *H01Q 9/16* (2013.01); *H04R 2420/07* (2013.01)

(58) Field of Classification Search
CPC .... H04R 1/1058; H04R 1/1016; H04R 1/105; H04R 5/04; H04R 5/033; H04R 2420/07; H01Q 1/243; H01Q 1/362
See application file for complete search history.

(56) References Cited

U.S. PATENT DOCUMENTS

| 2006/0003796 | A1* | 1/2006 | Vireday | .................. H04L 67/04 |
| | | | | 455/550.1 |
| 2013/0234906 | A1* | 9/2013 | Rosener | .................. H01Q 9/16 |
| | | | | 343/790 |
| 2014/0323183 | A1* | 10/2014 | Klein | ..................... H04B 1/385 |
| | | | | 455/569.1 |

(Continued)

*Primary Examiner* — Regina N Holder

(57) ABSTRACT

A first electronic device uses a first wireless link to connect wirelessly to an audio source device, and a second wireless link to connect to a second electronic device. In some cases, the first electronic device and the second electronic device can be worn by, or mounted to, a user. Upon receiving audio from the audio source device, the first electronic device extracts stereo channels from the received audio, and transmits at least one of the channels to the second electronic device. In some embodiments, an antenna of the first electronic device and an antenna of the second electronic device create a coaxial antenna pair. Alternately or additionally, each antenna, when worn by or mounted to a user, propagates an electric field in a direction generally normal to the user's head. In turn, this generates a creeping wave that travels along a surface, such as the surface of the user's head.

20 Claims, 6 Drawing Sheets

(56) References Cited

U.S. PATENT DOCUMENTS

| | | | |
|---|---|---|---|
| 2016/0029114 A1* | 1/2016 | Chen | H04R 1/1041 381/74 |
| 2016/0182991 A1* | 6/2016 | Zakzeski | H04R 1/1091 381/381 |
| 2017/0134845 A1* | 5/2017 | Milam | H04R 1/1041 |

* cited by examiner

WIRELESS STEREO HEADSET ANTENNA SYSTEM

BACKGROUND

Wireless devices communicate with one another using antennas to propagate and receive wireless signals (e.g., the antenna of a first device propagates a wireless signal, the antenna of a second device receives the wireless signal, and vice versa). A robust wireless link between the antennas increases the probability that information transferred by a first device over the wireless link is successfully received by the second device. To measure the robustness of a link, various metrics can be used that give an indication of antenna performance, such as Total Radiated Power (TPR) or Total Isotropic Sensitivity (TIS). When considering a free space operating environment, these measurements can be used to design antennas with reliable performance. However, these same antennas that yield high performance in a free space environment may yield lesser performance when used in other types of environments (i.e., an environment with additional obstructions, a multi-path environment, an environment with creeping waves, etc.). Thus, traditional metrics for antenna design may not accurately capture an antenna's performance in other operating environments.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
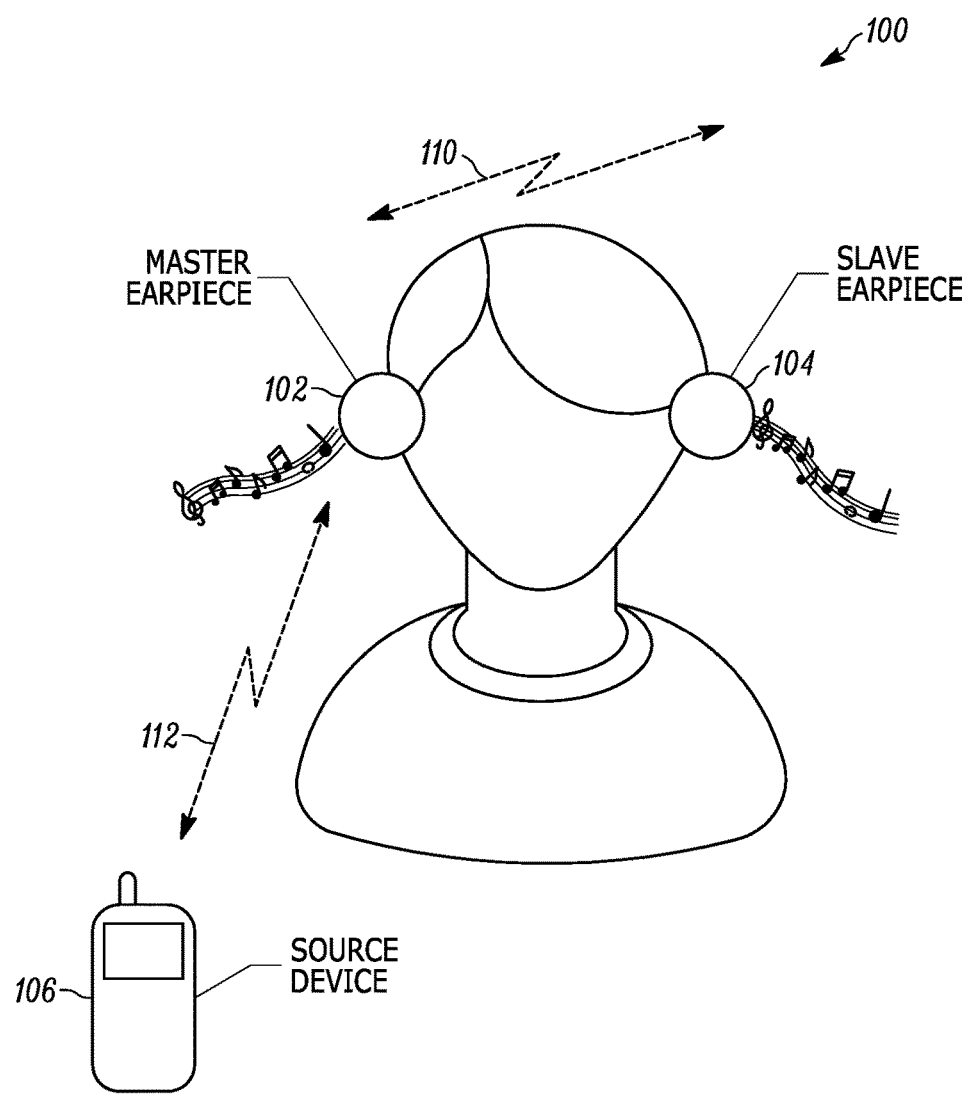
FIG. 1 is an overview of a representative environment that includes an example implementation in which the present techniques may be practiced.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Today, there is an expectation that electronic devices contain a large variety of functionality. For instance, mobile phone devices have evolved from simple devices that primarily sent and received telephone calls, into devices that run software applications, support Internet access through web browsers, capture and playback video, capture and playback audio, and so forth. At times, a user may desire to connect an electronic device with a personal speaker for audio playback, rather than use a speaker integrated into the electronic device. Monophonic audio playback (also referred to "mono") mixes all of the audio signals into a single channel, which is then played out at a speaker. Mono audio can either use a single speaker to play the channel, or multiple speakers that play the same channel. Conversely, stereophonic audio playback (also referred to as "stereo") uses two independent audio channels that have a specific level and phase relationship with one another. When the two channels are played back on an appropriate system, the resultant audio more closely resembles the original audio source. Each channel is played on a respective speaker, thus necessitating synchronization between the separate speakers. However, synchronizing the separate channels on separate speakers poses a few challenges when the audio source of the stereo signal wirelessly connects to the playback speakers.

The embodiments described herein provide a system for playing back stereo audio using a wireless connection. A first electronic device uses a first wireless link to connect wirelessly to an audio source device, and a second wireless link to connect to a second electronic device. In some cases, the first electronic device and the second electronic device (also referred to by some as "earbuds") can be worn by, or mounted to, a user, such as by inserting or mounting each electronic device into a respective ear canal of the user. Upon receiving audio from the audio source device, the first electronic device extracts one or more stereo channels from the received audio, then transmits at least one of the channels to the second electronic device over the second wireless link, along with timing information for synchronizing playback. In some embodiments, an antenna of the first electronic device and an antenna of the second electronic device create a coaxial antenna pair. Alternately or additionally, each antenna, when worn by or mounted on a user, propagates an electromagnetic wave in a direction generally normal to the user's head. In turn, this generates a "creeping" wave that travels along the surface of the user's head. Generally speaking, a creeping wave, as will be understood by the skilled artisan, is a wave that is propagated along the surface of a smooth body such as a sphere or, in this case, a user's head. The creeping wave is what carries or transmits the stereo channel from the first electronic device to the second electronic device.

Consider now an example environment in which the inventive principles can be employed.

Example Environment

FIG. 1 illustrates an example operating environment 100 in accordance with one or more embodiments. Environment 100 includes a master earpiece device 102, a slave earpiece device 104, and a source device 106. Here, master earpiece device 102 and slave earpiece device 104 are illustrated as wireless devices being worn by user 108. These earpieces work together as a pair to provide stereo playback of audio. Each earpiece is configured such that it is wearable by or mountable on a user. While these devices are illustrated as independent from one another and have no structural connection to each other, it is to be appreciated that alternate embodiments can have a structural connection between the devices while still maintaining a wireless link. For example, master earpiece device 102 and slave earpiece device 104 can be physically connected with a metal or plastic headband configured to fit the shape of a head.

To provide stereo playback, a first channel of the stereo audio is played through master earpiece device 102, while a second channel of the stereo audio is played through slave earpiece device 104. In order to synchronize the two channels, master earpiece device 102 wirelessly couples to slave earpiece device 104 using wireless link 110, as further described below. In some embodiments, wireless link 110 is a True Wireless™ link. However, any other suitable type of wireless protocol or connection can be used without departing from the scope of the claimed subject matter. As implied by the naming convention, master earpiece device 102 is a master device over slave earpiece device 104 and has some control over how slave earpiece device 104 performs or functions. In the context of stereo playback, master earpiece device 102 not only wirelessly provides slave earpiece device 104 with its respective audio channel, but it additionally manages the synchronization of the playback between the two earpiece devices by way of the creeping wave mentioned above. However, before sending slave earpiece device 104 its respective audio channel, master earpiece device 102 first receives audio from source device 106.

Source device 106 represents a media device that contains media (e.g., audio). Here, source device 106 is illustrated as being a mobile phone with audio capabilities, but it is to be appreciated that source device 106 can take any other suitable form of a device that stores media, such as a tablet, a laptop, a gaming device, a desktop computer, and so forth. To playback media, source device 106 first connects to master earpiece device 102 through wireless link 112, then transmits the corresponding audio data. Wireless link 112 represents any suitable type of wireless link and its corresponding protocols. In some embodiments, wireless link 112 is a Bluetooth link that realizes the various protocols, messaging, and signals as defined by Bluetooth standards. However, any other suitable type of wireless link or standard and can be used without departing from the scope of the claimed subject matter, such as a Wi-Fi connection, a cellular connection, and so forth.

Figure 2:
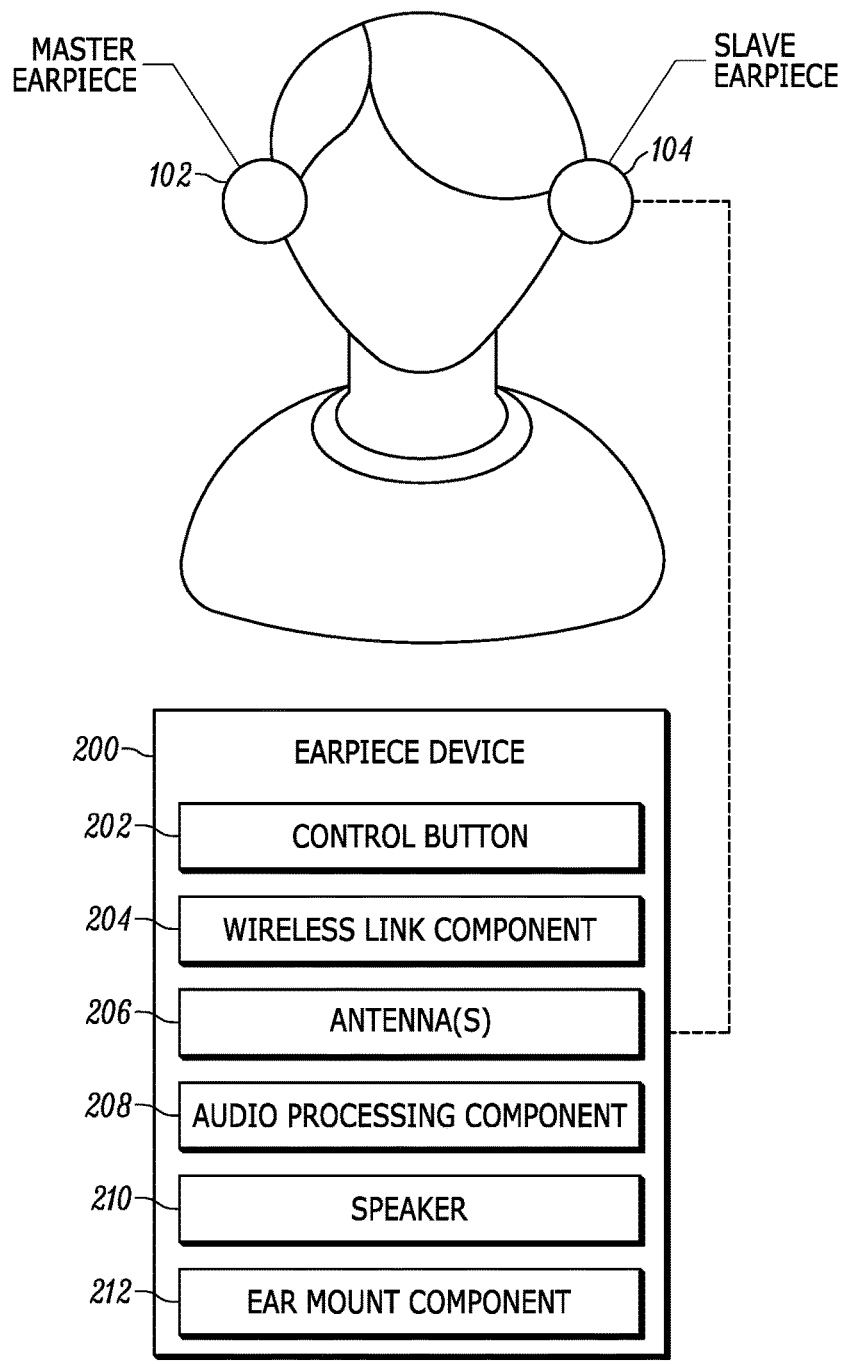
FIG. 2 illustrates a more detailed view of an example implementation included in FIG. 1.

Continuing on with this example, now consider FIG. 2. Earpiece device 200 represents a more detailed example of an earpiece device, such as master earpiece device 102 or slave earpiece device 104 of FIG. 1. For discussion purposes, the contents of earpiece device 200 have been simplified, and are not intended to cover all technical aspects that can be included in an earpiece device. Accordingly, it is to be appreciated that earpiece device 200 can include additional components, elements, modules, etc. not described here. In this illustration, earpiece device 200 is shown as a more detailed view of slave earpiece device 104. However, various the aspects described with respect to earpiece device 200 can alternately or additionally be included in master earpiece device 102.

Earpiece device 200 includes at least one control button 202. Here, control button 202 is used to generally represent one manner in which a user may interact with the earpiece device. In some cases, a control button can simply be a power switch that a user taps or toggles to power up or power down earpiece device 200. In other cases, a control button can be a multi-purpose button, where different types of interactions invoke different behaviors from earpiece device 200. For example, in addition to tapping on a control button to invoke a power up or power down sequence in earpiece device 200, a press-and-hold on the same control button can initiate wireless connectivity protocol, such as a Bluetooth pairing. Thus, a user can control the behavior of earpiece device through control button 202. Though earpiece device 200 simply includes one control button, it is to be appreciated that other implementations of an earpiece device can include multiple control buttons, or none.

Wireless link components 204 generally represent functionality configured to perform or maintain wireless protocols and their associated links (i.e., connection protocols, disconnect protocols, data transfer protocols, frequency bands, digital encoding, etc.). An earpiece device can include any suitable number of wireless link components. For example, when earpiece device 200 functions as a master earpiece, it can include a first wireless link component to support a Bluetooth link to an audio source, and a second wireless link component to support a True Wireless™ link to a slave earpiece. As another example, when earpiece device 200 functions as a slave earpiece, it may simply include a single wireless link component that supports a True Wireless™ link in order to connect to a master earpiece. A wireless link component can be configured in any suitable way, such as software, firmware, hardware, an integrated circuit (IC), or any combination thereof.

Earpiece device 200 also includes antenna(s) 206, which generally represents functionality that transmits or receives radio waves by converting electrical signals into the radio waves, or vice versa. Each antenna included in earpiece device 200 can be configured in any suitable manner, such as a dipole antenna, a monopole antenna, a spiral antenna, a parabolic reflector antenna, a micro-strip antenna, a chip antenna, and so forth. Further, any suitable type of conductive material can be used to construct an antenna, such as a copper or copper based material, an aluminum or aluminum based material, etc. At times, the size, shape, and position of an antenna (or the components that make up an antenna) can be based upon the radio waves being transmitted, received, and/or the environment in which they are propagating, as further described below. For example, the size, shape, and position of an antenna can be chosen to generate a higher quality link between a master earpiece and a slave earpiece when the earpieces are worn by a user, versus a link when they are not. Earpiece device 200 can include multiple antenna, each associated with a respective purpose (e.g., a respective wireless link, radio wave format, etc.), a single antenna that is single-purpose, or a single antenna that is multi-purpose (e.g., used for multiple wireless links).

Earpiece device 200 also includes audio processing component 208 and speaker 210. Among other things, audio processing component 208 represents functionality that processes a received audio signal, such as an audio signal received wirelessly via wireless link component 204, and drives playback of the audio signal through speaker 210. In some embodiments, such as when earpiece device 200 is configured as a master earpiece, audio processing component 208 extracts the various stereo channels from the received audio, forwards one of the stereo channels to the respective slave device, and/or prepares the stereo channel with respect to the master earpiece for playback on its respective speaker 210. In other embodiments, such as when earpiece device 200 is configured as a slave earpiece, audio processing component 208 processes the received audio or stereo channel, and prepares it for playback on its respective speaker 210. In some cases, audio processing component 208 manages the synchronization of stereo playback between a master earpiece and a slave earpiece. Audio processing component 208 can be implemented in any suitable manner, such as through a processor executing software, firmware, hardware, or any combination thereof. At times, audio processing component drives speaker 210 with the corresponding electrical signals. In turn, speaker 210 converts the electrical signals into a corresponding sound wave.

Ear mount component 212 represents a structural component that enables a user to mount or wear earpiece device 200. In some cases, ear mount component 212 is implemented as a rubber or malleable ear tip that secures earpiece device 200 into an ear canal such that the earpiece device remains stable and in place. In other cases, ear mount component 212 can be an ear hook designed to curve around an outer ear from front to back, a headband that connects two earpieces and is worn such that the earpieces are positioned over the respective ears, etc.

Generally, any of the functions described herein can be implemented using software, firmware, hardware (e.g., fixed logic circuitry), manual processing, or a combination of these implementations. The terms "module," "functionality," "component" and "logic" as used herein generally represent software, firmware, hardware, or a combination thereof. In the case of a software implementation, the module, functionality, component or logic represents program code that performs specified tasks when executed on or by a processor (e.g., CPU or CPUs). The program code can be stored in one or more computer readable memory devices.

Having described an example operating environment in which various embodiments can be utilized, consider now a discussion of antenna configuration with respect to wireless earpieces, in accordance with one or more embodiments.

Antenna Configuration for Wireless Stereo Earpieces

Electronic devices today often times include wireless capabilities to connect with other devices. To communicate information back and forth, the electronic devices establish a wireless link that conforms to predefined protocol and frequency standards. A wireless link can be more powerful than a wired link in that it provides more freedom to the connecting devices. A first device can essentially connect wirelessly to any recipient device that supports a same wireless link format without using any additional peripheral components or devices. Further, a wireless link allows for the additional freedom of mobility. However, a wireless link is only as useful as it is reliable. For example, an unreliable or weak wireless link can lead to a higher percentage of faulty data transfers when compared to a stable and reliable wireless link.

Consider again the above example of FIG. 1, where a source device transmits stereo audio. To maintain wireless link 112, source device 106 and master earpiece device 102 use antennas to propagate and receive wireless signals in the form of electromagnetic radiation. Similarly, master earpiece device 102 and slave earpiece device 104 use antennas to maintain wireless link 110. Being a form of electromagnetic radiation, the wireless signals propagated between the respective devices adhere to various wave and particle properties, such as reflection, refraction, scattering, absorption, polarization, etc. As can be seen, wireless link 112 between the source device and the master earpiece is relatively unobstructed. Conversely, wireless link 110 between the master earpiece and the slave earpiece has the added obstruction of a user's head when each earpiece is mounted to a respective ear. Thus, the obstruction poses more challenges in making wireless link 110 a reliable connection.

Some embodiments provide a system for playing back stereo audio using wireless connections in the presence of an obstruction. A first earpiece wirelessly connects to an audio source device using a first wireless link to obtain audio, and wirelessly connects to a second earpiece to synchronize audio playback. In some cases, the first earpiece and the second earpiece can be worn by, or mounted on, a user. In turn, the user's head can create an obstruction in the wireless link between earpieces. Upon receiving audio from the audio source device, the first earpiece extracts stereo channels from the received audio, and transmits at least one of the channels to the second earpiece. To overcome the obstruction, some embodiments configure and orient the respective antenna of each earpiece to create a coaxial antenna pair having properties that are favorable to transmission of the stereo channel to the second earpiece. Alternately or additionally, the configuration and orientation of respective antennas can be configured to, when worn by or mounted on a user, propagate an electromagnetic field such that the electric field is in a direction generally normal to the user's head. In turn, this generates and/or strengthens the power of a creeping wave that travels along a surface, such as the surface of the user's head, and enables transmission of the stereo channel to the second earpiece.

Figure 3A:
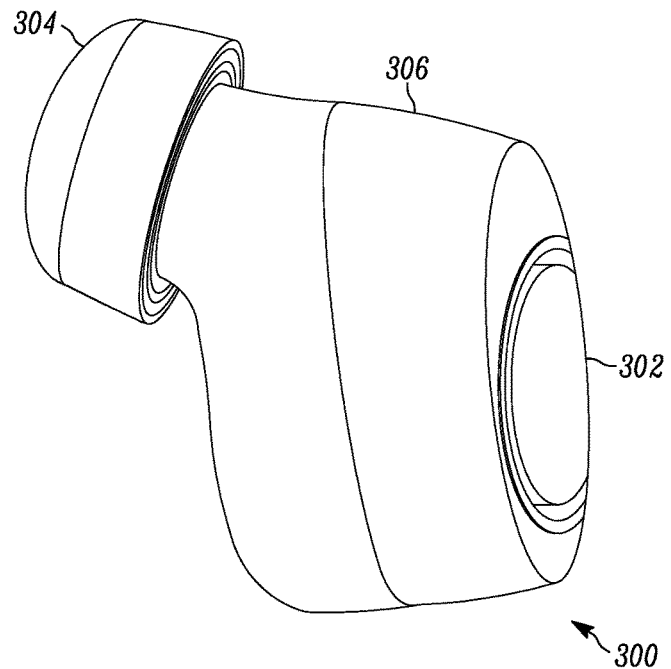
FIGS. 3a and 3b illustrate alternate views of another example implementation in which the present techniques may be practiced.
Figure 3B:
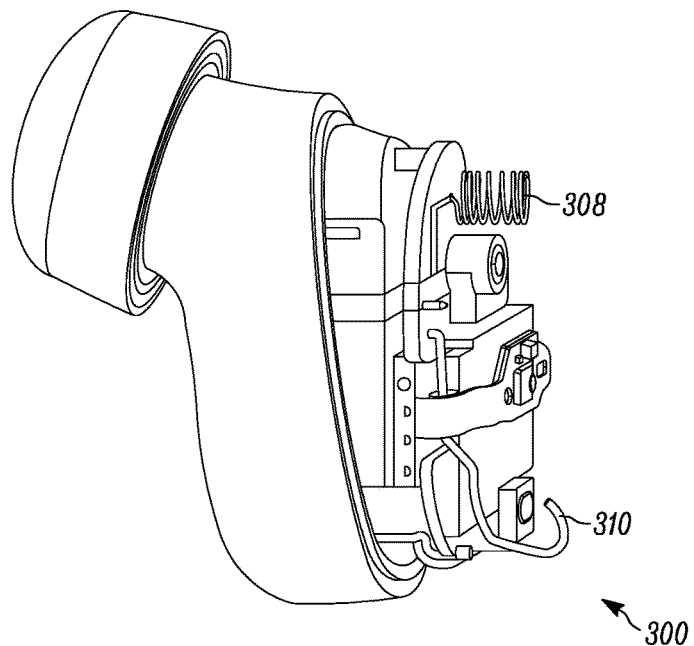

To further illustrate, now consider FIGS. 3a and 3b, which include alternate views of an example earpiece device in accordance with one or more embodiments. In FIG. 3a, earpiece device 300 depicts the example earpiece device with its housing closed. FIG. 3b depicts the same example earpiece device with part of its housing removed. In some cases, earpiece device 300 can be master earpiece device 102 and/or slave earpiece device 104 of FIG. 1.

Earpiece device 300 includes a control button 302. To interface with earpiece device 300, a user actuates control button 302 by applying pressure to the button. In turn, control button 302 makes contact with components or contact points internal to earpiece device 300. This then directs earpiece device 300 to perform an action. Control button 302 can be single-purpose, or multi-purpose as further discussed above.

Earpiece device 300 also includes ear mount component 304 which allows earpiece device 300 to be mounted and worn by a user. Here, ear mount component 304 takes the form of an ear cover or tip made of a malleable or semi-elastic material, such as rubber or silicone. The semi-elastic material allows earpiece device 300 to be comfortably inserted and seated into an ear canal of a user. However, any other suitable type of component can be used to mount earpiece device 300 to a user without departing from the scope of the claimed subject matter. Ear mount component 304 also fits over a speaker which is directed inwards and towards the user's ear drum when earpiece device 300 is mounted to a user.

Housing 306 of earpiece device 300 is a chassis that houses the various components that make up earpiece device 300, such as a speaker, wireless transmitting components, wireless receiving components, audio processing modules, and so forth. Here, housing 306 has a shape and size that enables earpiece device 300 to be mounted within an ear canal, as further described above.

In FIG. 3b, portions of housing 306 have been removed to expose various components contained within earpiece device 300. Among other things, earpiece device 300 includes an antenna 308 and counterpoise 310. Generally speaking, antenna 308 radiates and receives electromagnetic waves, while counterpoise 310 functions as a low-resistance ground connection for earpiece device 300. In some embodiments, antenna 308 and counterpoise 310 create a dipole antenna, as further described below. In this particular example, antenna 308 comprises a helical antenna having a helix shape. Other antennas can be used without departing from the spirit and scope of the claimed subject matter. For simplicity sake, the discussion of the exposed components of earpiece device 300 will be reserved to these items. However, various implementations can include additional components, such as a battery, an audio transducer, wireless communication chip sets, and so forth.

As previously discussed, an antenna can be used to convert electrical signals to transmitted RF signals, and vice versa (e.g., converts a received RF signal into electrical signals). An antenna can be single-purpose, such as dedicated to either transmitting an RF signal or receiving an RF signal, or be multi-purpose to transmit and receive one or more RF signals. An antenna can be figured for short range communications or long range communications, can be configured for various power levels, etc. Thus, an antenna can be configured in a variety of manners depending upon its intended application.

One type of antenna is a dipole antenna. A dipole antenna consists of two components that are usually symmetrical in length. In a half-wave dipole antenna, each pole has length of $\lambda/4$, where $\lambda$ represents a wavelength corresponding to a frequency at which the dipole antenna is resonant. When an antenna is resonant, waves of current and voltage traveling between the arms of the antenna create a standing wave. This generates a lower impedance than at other frequencies, and simplifies impedance matching between the antenna and transmission lines for transmission or reception. In turn, this affects the power consumption and efficiency of an antenna. Accordingly, an antenna's resonant frequency can be controlled by various types of adjustments to the antenna length, radius, and so forth. It is to be appreciated by one skilled in the art that the above discussion has been simplified, and is not intended to describe all technical aspects of antenna design. In this example, antenna 308 and counterpoise 310 are configured together as a half-wave dipole antenna, where each have a length of $\lambda/4$, or approximately $\lambda/4$. As one skilled in the art will appreciate, the length of each pole of a half-wave dipole antenna may be slightly adjusted from exactly $\lambda/4$ to account for real world implementations, target resonant frequencies, etc. In some cases, a target resonant frequency is associated with a protocol or wireless format being transmitted or received.

In this example, antenna 308 has a helix shape and is designed to fit within housing 306 (e.g., when housing 306 is closed, antenna 308 fits inside). While counterpoise 310 takes on a separate shape, it is also designed to fit within housing 306. However, any other suitable shapes can be used without departing from the scope of the claimed subject matter. For example, in some embodiments, each pole of the antenna can have the shape of a straight line that protrudes external to housing 306, can be a zig-zag shaped wire that fits within housing 306, etc. In addition to the length of each pole, the orientation of an antenna can affect how electromagnetic waves radiate from the antenna. Here, antenna 308 is configured to be generally oriented perpendicular to a user's head when earpiece device 300 is mounted or inserted into an ear canal. Here, "generally perpendicular" is used to signify that, while ideally antenna 308 should be oriented perpendicular (e.g., 90°) to the user's head, real world conditions allow for antenna orientations that deviate from 90° but still maintain successful operation or wireless links. In a similar manner, counterpoint 310 is oriented to be generally perpendicular to antenna 308. In some embodiments, this configuration generates an electromagnetic field that can be advantageous when earpiece device 300 is mounted or worn by a user, as further described below. In FIGS. 3a and 3b, earpiece device 300 is illustrated as a single earpiece device. However, when used in a system, earpiece device 300 is used in a pair (e.g., a master earpiece and a slave earpiece). When considered in pair, the orientation of antenna 308 and its respective pair are generally coaxial with one another, since the antennas are disposed along the same axis.

Figure 4:
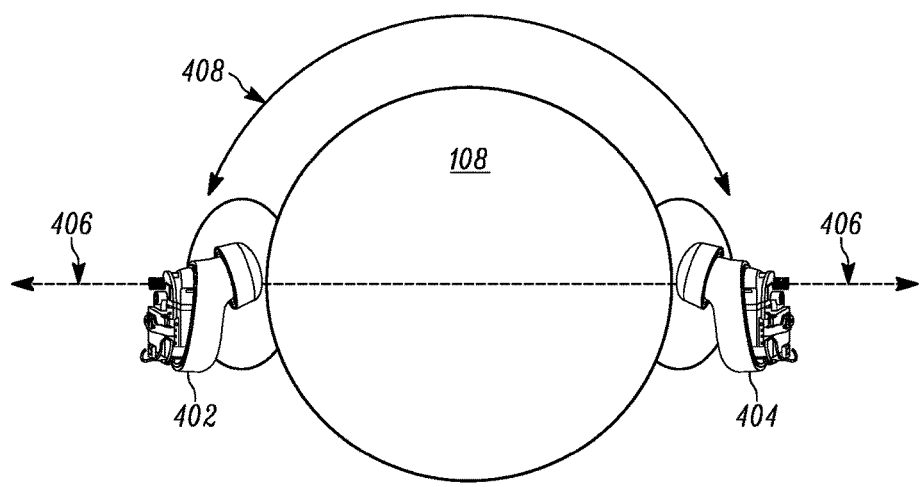
FIG. 4 illustrates an example of an antenna pair with coaxial orientation.

To further illustrate, consider FIG. 4, which includes user 108 of FIG. 1 wearing a pair of earbuds, labeled here as earpiece device 402 and earpiece device 404. In some cases, earpiece device 402 and earpiece device 404 are a master/slave pair of earbuds similar to that described above. When mounted on the user, the antenna of each earpiece is generally disposed along a same axis, labeled here as axis 406, although axis variation can occur because of a number of environmental or physiological factors. In free space or open air (e.g., without the presence of a user or any obstruction therebetween), the transmission and reception of wireless signals between a pair of coaxial antenna tends to be less efficient or reliable than other antenna pair orientations, such as a collinear orientation (i.e., comparatively, less of the signal is received when the power and distance are equal between the varying orientations), However, when mounted on a user, the coaxial orientation of the respective antenna yields more desirable results, and a more reliable link between the two. Here, the insertion direction of earpiece device 402 and earpiece device 404 is generally towards the user's head along axis 406. Again, "generally" is used here to allow for real world deviations from axis 406 that result in successful operation (e.g., each earpiece may deviate from axis 406). When oriented in this manner, the electric field component of the electromagnetic field propagated from the corresponding antenna becomes generally perpendicular or normal to the plane of a user's head, or generally along a same axis as the insertion direction of each earpiece. In turn, this maximizes the creeping wave that is launched and traverses the surface of the user's head, illustrated here as link 408. In other words, the presence of the generally perpendicular electric field increases the strength or presence of the creeping wave when compared to a creeping wave generated without a generally perpendicular electric field. Thus, in some embodiments, each earpiece of the pair includes an antenna that, when worn or mounted, is oriented in such a way as to generate an electric field generally normal to a surface associated with where the earpiece is mounted and, in turn, generate a creeping wave. Here, the creeping wave is generated by using an antenna pair with a (generally) coaxial orientation with one another, but it is to be appreciated that other embodiments can be utilized, including other antenna types, orientations and the like, without departing from the scope of the claimed subject matter.

Figure 5:
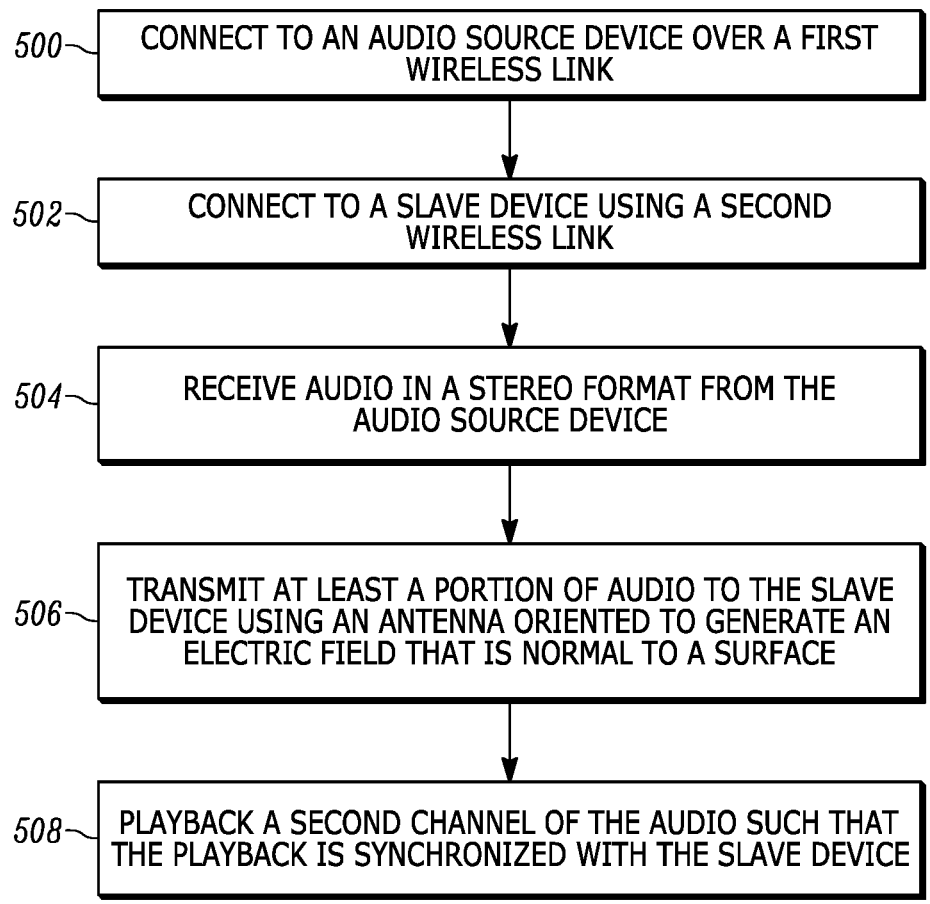
FIG. 5 illustrates an example flow diagram in which coaxial antenna orientation is employed.

FIG. 5 illustrates a flow chart that describes steps in a method in accordance with one or more embodiments. The method can be performed by any suitable hardware, software, firmware, or combination thereof. In at least some embodiments, aspects of the method can be implemented by one or more suitably configured software modules, such as master earpiece device 102 of FIG. 1.

Step 500 connects to an audio source device over a first wireless link. In some embodiments, a master earpiece device connects to the audio source device using a Bluetooth link. However, any other suitable type of wireless link can be utilized. In some cases, the connection process is initiated in response to a control button being actuated, while in other cases it is initiated automatically upon power up. Step 502 connects to a slave device using a second wireless link. This step can be performed by a master earpiece device connecting to the slave device, examples of which are provided above.

Responsive to connecting to the audio source device, step 504 receives audio in a stereo format from the audio source device. Any suitable type of digital or analog format can be used to transmit the audio in a stereo format, such as through digital audio broadcasting, through high definition radio, using Waveform Audio File Format (WAV) files, using Audio Interchange File Format (AIFF) files, Pulse-code modulation (PCM) formats, and so forth.

Responsive to receiving the audio, step 506 transmits at least a portion of the audio to the slave device using an antenna oriented to generate an electric field that is normal to a surface of a user's head. For example, as further described above, the antenna can be oriented in a coaxial orientation with an antenna of the slave device such that, when mounted on the user, the antenna generates an electric field that is generally normal to the surface of the user's head. In turn, this generates a creeping wave over the surface of the user's head to the slave device. The creeping wave is what enables transmission of the audio, and other information, to the slave device. However, other orientations can be utilized without departing from the scope of the claimed subject matter. In some cases, stereo channels are extracted from the received audio, and at least one of the channels is transmitted to the slave device.

Responsive to transmitting at least a portion of the audio to the slave device, step 508 plays a second channel of the audio such that the playback is synchronized with the slave device. For example, some implementations utilize a True Wireless™ link and its associated protocols to synchronize stereo playback of multiple channels. This includes transmitting the audio signal, as well as timing information, to the slave device to enable playback synchronization, as will be appreciated by the skilled artisan.

Having considered a discussion of an antenna configuration with respect to wireless earpieces, consider now a discussion of an example device that can be utilized to implement the embodiments described above.

Example Device

Figure 6:
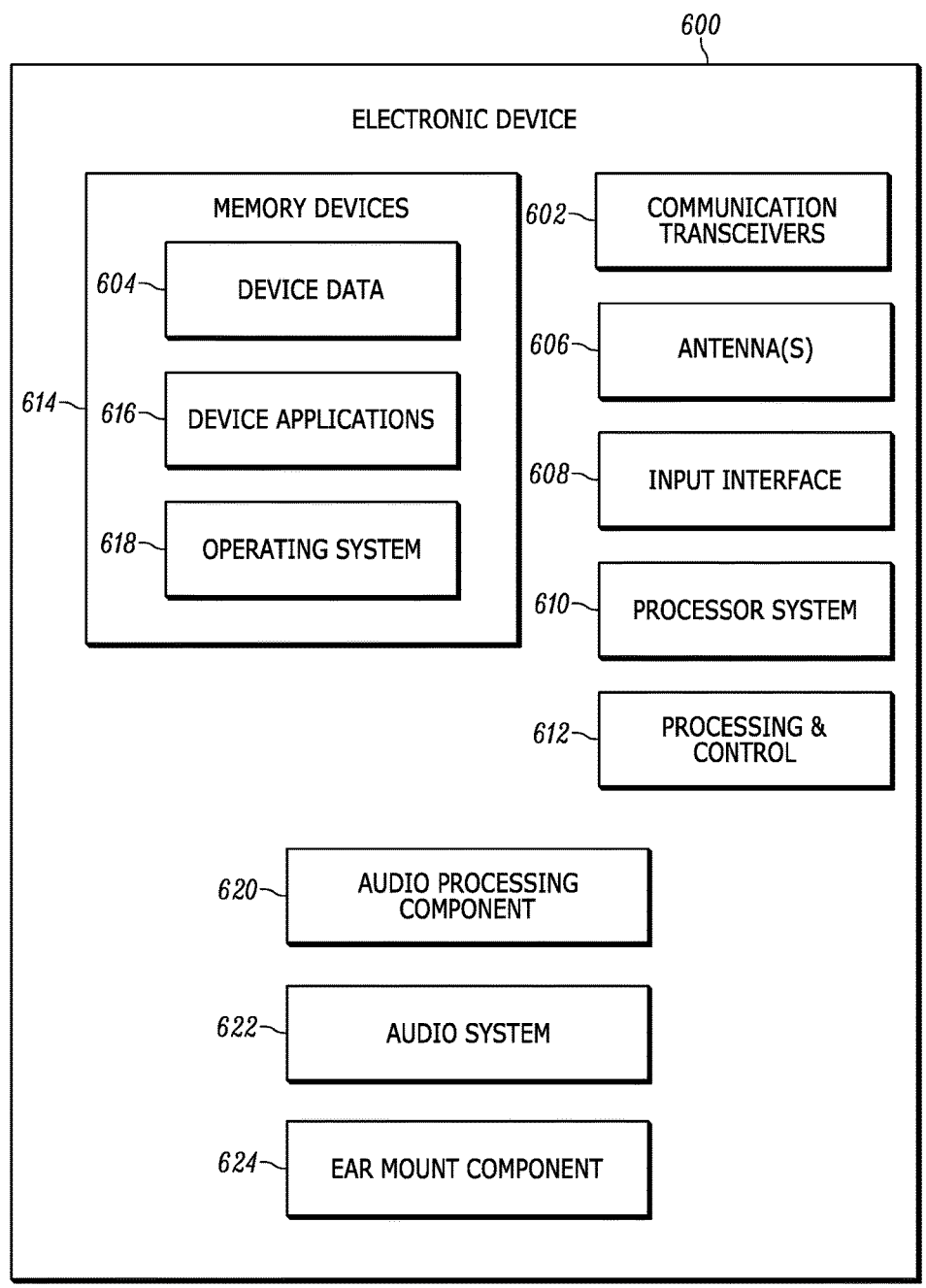
FIG. 6 is an illustration of a device that can use the present techniques.

FIG. 6 illustrates various components of an example electronic device 600 that can be utilized to implement the embodiments described herein. Electronic device 600 can be, or include, many different types of devices capable of implementing stereo playback using wireless earpieces, such as master earpiece device 102 or slave earpiece device 104 of FIG. 1.

Electronic device 600 includes one or more communication transceivers 602 that enable wireless communication of device data 604, such as audio data, synchronization data, protocol data or signaling, etc. The term transceivers is used here to generally refer to transmit and receive capabilities. Example communication transceivers include WPAN radios compliant with various Institute of Electrical and Electronics Engineers (IEEE) 802.15 (Bluetooth™) standards, WLAN radios compliant with any of the various IEEE 802.11 (WiFi™) standards, WWAN (3GPP-compliant) radios for cellular telephony, wireless metropolitan area network radios compliant with various IEEE 802.16 (WiMAX™) standards, and wired LAN Ethernet transceivers.

Communications transceivers 602 work in conjunction with antenna(s) 606 to transmit and receive data. Among other things, antenna(s) 606 can receive an electrical signal generated by electronic device 600 and propagate a corresponding electromagnetic wave. Similarly, antenna(s) 606 can receive or detect electromagnetic waves and convert these waves into corresponding electrical signals detectable by electronic device 600. In some embodiments, antenna(s) 606 are configured to, when electronic device 600 is worn by or mounted on a user, generate an electric field that is generally normal to a surface associated with the user, examples of which are provided above.

Electronic device 600 may also include one or more input interface 608 via which inputs can be received, such as control buttons, toggle switches, etc. Input interface 608 enables a user to enter input to electronic device in order to direct its respective functionality.

Electronic device 600 of this example includes processor system 610 (e.g., any of application processors, microprocessors, digital-signal processors, controllers, and the like) or a processor and memory system (e.g., implemented in a system-on-chip), which processes computer-executable instructions to control operation of the device. A processing system may be implemented at least partially in hardware, which can include components of an integrated circuit or on-chip system, digital-signal processor, application-specific integrated circuit, field-programmable gate array, a complex programmable logic device, and other implementations in silicon and other hardware. Alternatively or in addition, the electronic device can be implemented with any one or combination of software, hardware, firmware, or fixed-logic circuitry that is implemented in connection with processing and control circuits, which are generally identified at 612 (processing and control 612). Although not shown, electronic device 600 can include a system bus, crossbar, interlink, or data-transfer system that couples the various components within the device. A system bus can include any one or combination of different bus structures, such as a memory bus or memory controller, data protocol/format converter, a peripheral bus, a universal serial bus, a processor bus, or local bus that utilizes any of a variety of bus architectures.

Electronic device 600 also includes one or more memory devices 614 that enable data storage, examples of which include random access memory (RAM), non-volatile memory (e.g., read-only memory (ROM), flash memory, EPROM, EEPROM, etc.), and a disk storage device. Memory devices 614 are implemented at least in part as a physical device that stores information (e.g., digital or analog values) in storage media, which does not include propagating signals or waveforms. The storage media may be implemented as any suitable types of media such as electronic, magnetic, optic, mechanical, quantum, atomic, and so on. Memory devices 614 provide data storage mechanisms to store the device data 604, other types of information or data, and various device applications 616 (e.g., software applications). For example, operating system 618 can be maintained as software instructions within memory devices 614 and executed by processors 610.

Electronic device 600 also includes audio processing component 620 that processes audio data and passes through to audio system 622. In some cases, audio processing component 620 extracts various channels associated with stereo audio, and forwards at least one channel to a paired device using communication transceivers 602 and/or antenna(s) 606. In other cases, audio processing component simply receives a channel of stereo audio for playback. At times, audio processing component 620 synchronizes the playback of the audio with another device. Audio system 622 may include any components used render audio, such as a speaker. Audio signals can be communicated to an audio system via any suitable link.

Electronic device 600 also includes ear mount component 624, which is used to enable electronic device 600 to be worn by a user, or mounted to a user, examples of which are provided above.

It is to be appreciated that while electronic device 600 includes distinct components, this is merely for illustrative purposes, and is not intended to be limiting. For example, some embodiment may exclude various components listed in electronic device 600, such as operating system 618 and/or device applications 616. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. An electronic device for playing back wireless audio, the electronic device comprising:
    one or more wireless link components configured to maintain a first wireless link with an audio source device and a second wireless link with a second electronic device;
    an ear mount component configured to be inserted into a user's ear canal;
    an audio processing component configured to process audio signals received through the first wireless link and enable playback of the audio signals;
    a speaker operably connected to the audio processing component and the ear mount and configured to play audio signals; and
    at least one antenna configured to, when the ear mount component has been inserted into the user's ear canal in an insertion direction generally normal to a user's head, have a coaxial orientation with a second antenna associated with the second electronic device that propagates an electric field in a direction that is generally the same as the insertion direction effective to enable the electronic device to transmit portions of the audio signals, using the at least one antenna, to the second electronic device via the second wireless link.

2. The electronic device of claim 1, wherein:
    the electronic device comprises a master device; and
    the second wireless link comprises a True Wireless™ link.

3. The electronic device of claim 1, wherein the ear mount component comprises a malleable ear tip.

4. The electronic device of claim 1, wherein the electronic device comprises a master device, and the audio processing component is further configured to:
    extract a first stereo channel from the audio signals received through the first wireless link; and
    extract a second stereo channel from the audio signals received through the first wireless link for transmission to the second electronic device.

5. The electronic device of claim 4, wherein the electronic device is configured to transmit the portions of the audio signal by:
    forwarding the second stereo channel wirelessly to the second electronic device using the at least one antenna; and
    synchronizing playback of the first stereo channel with the second stereo channel.

6. The electronic device of claim 1, wherein the at least one antenna comprises a helical antenna.

7. The electronic device of claim 1, wherein the audio processing component is further configured to process audio signals having:
    a Waveform Audio File Format (WAV); or
    an Audio Interchange File Format (AIFF).

8. A system for playing back wireless stereo, the system comprising:
    a master earpiece device comprising:
        a first housing comprising:
            a source device wireless link component configured to maintain a source device wireless link with an audio source device;
            a first slave device wireless link component configured to maintain a slave device wireless link with a slave earpiece device;
            a first ear mount component configured to be inserted into a user's ear canal;
            a first audio processing component configured to process audio received through the source device wireless link;
            a first speaker operably connected to the first audio processing component and the first ear mount and configured to play audio; and
            a first antenna configured to transmit at least a portion of the audio over the slave device wireless link; and
    a slave earpiece device comprising:
        a second housing comprising:
            a second slave device wireless link component configured to maintain the slave device wireless link with the master earpiece device;
            a second ear mount component configured to be inserted into a user's ear canal;
            a second audio processing component configured to process audio received through the slave device wireless link;
            a second speaker operably connected to the second audio processing component and the second ear mount component and configured to play audio; and
            a second antenna configured to receive said at least a portion of the audio over the slave device wireless link;
        wherein the first antenna and the second antenna are configured to form a generally coaxial antenna pair when the first ear mount component and the second ear mount component are inserted in each respective ear canal.

9. The system of claim 8, wherein the master earpiece device is configured to maintain a Bluetooth link as the source device wireless link.

10. The system of claim 8, wherein the first antenna or the second antenna comprises a helix shape.

11. The system of claim 8, wherein the first antenna or the second antenna comprises a half-wave dipole antenna.

12. The system of claim 8, wherein the first audio processing component is configured to synchronize the slave earpiece device with the master earpiece device for playback of audio.

13. The system of claim 8, wherein the first antenna or the second antenna, are configured to, when the first ear mount component or the second ear mount component has been respectively inserted into an ear of the user in an insertion direction generally normal to the user's head, have an orientation that propagates an electric field in a direction that is generally the same as the insertion direction effective to enable the master earpiece device to launch a creeping wave for receipt by the slave earpiece device.

14. The system of claim 8, wherein the first and second antenna have a helix shape and, when both ear mount components are inserted into respective ears of a user, the first antenna is configured to propagate an electric field generally normal to the user's head effective to propagate a creeping wave that enables transmission from the master earpiece device to the slave earpiece device.

15. A method for playing back wireless stereo, the method comprising:
- connecting, using a master earpiece device, to an audio source device using a first wireless link;
- connecting, using the master earpiece device, to a slave earpiece device using a second wireless link;
- receiving, from the audio source device and using the master earpiece device, audio over the first wireless link;
- transmitting, to the slave earpiece device and using the second wireless link, at least a portion of the audio via an antenna oriented to propagate, when the master earpiece device is inserted in an insertion direction generally normal to a user's head, an electric field in a direction that is generally the same as the insertion direction effective to enable the master earpiece device to transmit portions of the audio using the at least one antenna, the antenna configured to form a generally coaxial antenna pair with an antenna of the slave earpiece device when the master earpiece device and the slave earpiece device are inserted in respective ear canals of a user; and
- synchronizing, using the master earpiece device, playback of the audio on the master earpiece device and the slave earpiece device.

16. The method of claim 15, wherein transmitting at least a portion of the audio comprises:
- extracting, using the master earpiece device, a first channel associated with stereo audio from the received audio;
- extracting, using the master earpiece device, a second channel associated with stereo audio from the received audio; and
- transmitting the second channel to the slave earpiece device.

17. The method of claim 15, wherein transmitting at least a portion of the audio via an antenna further comprises transmitting at least a portion of the audio using a half-wave dipole antenna.

18. The method of claim 17, wherein the half-wave dipole antenna comprises a helix shape.

19. The method of claim 15, wherein transmitting at least a portion of the audio via an antenna further comprises transmitting at least a portion of the audio via an antenna configured to generate a creeping wave that traverses a surface between the master earpiece device and the slave earpiece device.

20. The method of claim 15, wherein connecting to the audio source device comprises connecting to the audio source device responsive to actuation of a control button.

* * * * *